United States Patent [19]
Burt

[11] Patent Number: 6,032,835
[45] Date of Patent: Mar. 7, 2000

[54] AEROSOL DISPENSER AND METHOD

[75] Inventor: Peter Colin Weston Burt, Ware, United Kingdom

[73] Assignee: Glaxo Group Ltd., Greenford Middlesex, United Kingdom

[21] Appl. No.: 09/149,858

[22] Filed: Sep. 9, 1998

Related U.S. Application Data

[63] Continuation of application No. 08/481,392, filed as application No. PCT/EP94/00101, Jan. 17, 1994, abandoned.

[30] Foreign Application Priority Data

Jan. 19, 1993 [GB] United Kingdom .................. 9300931
Jan. 19, 1993 [GB] United Kingdom .................. 9300932

[51] Int. Cl.⁷ ............................................. B65D 83/14
[52] U.S. Cl. ................................ 222/402.1; 228/110.1
[58] Field of Search ........................... 222/402.1, 402.2; 228/110.1, 184, 155, 158, 101

[56] References Cited

U.S. PATENT DOCUMENTS

| | | | |
|---|---|---|---|
| 3,343,730 | 9/1967 | Nier et al. | 228/110.1 |
| 3,622,053 | 11/1971 | Ryden | 222/402.12 |
| 3,899,116 | 8/1975 | Mims | 228/110.1 |
| 4,341,330 | 7/1982 | Mascia et al. | 222/402.1 |
| 4,749,437 | 6/1988 | Welter | 228/1.1 |
| 4,762,254 | 8/1988 | Nitta . | |
| 4,887,743 | 12/1989 | Blake . | |
| 4,919,312 | 4/1990 | Beard et al. | 222/402.2 |
| 4,953,759 | 9/1990 | Schmidt . | |
| 4,969,577 | 11/1990 | Werding . | |
| 5,037,012 | 8/1991 | Langford . | |

FOREIGN PATENT DOCUMENTS

| | | |
|---|---|---|
| 0 191 614 A2 | 8/1986 | European Pat. Off. . |
| 1 336 379 | 11/1973 | United Kingdom . |
| 1 358 498 | 7/1974 | United Kingdom . |
| 1 379 123 | 1/1975 | United Kingdom . |
| 2 145 775 | 4/1985 | United Kingdom . |
| 2 198 117 | 6/1988 | United Kingdom . |
| WO 84/01356 | 4/1984 | WIPO . |
| WO 86/06701 | 11/1986 | WIPO . |
| WO 87/04685 | 8/1987 | WIPO . |
| WO 89/08062 | 9/1989 | WIPO . |

*Primary Examiner*—Philippe Derakshani
*Attorney, Agent, or Firm*—Bacon & Thomas

[57] ABSTRACT

An aerosol dispenser is provided which comprises a body (1), a closure (2) sealed to the body (1), and propellant (7) for dispensing material from the interior of the dispenser. The closure (2) is welded to the body (1) by a metal-to-metal weld. Preferably the welding is carried out ultrasonically. A method for assembling the aerosol dispenser is also provided.

10 Claims, 6 Drawing Sheets

Comparison of leakage results

AEROSOL DISPENSER AND METHOD

This application is a continuation application of U.S. application Ser. No. 08/481,392 filed Jul. 18, 1995 now abandoned, which is a 371 of PCT/EP94/00101 filed Jan. 17, 1994.

This invention relates to an aerosol dispenser, i.e. a dispenser from which a material can be dispensed in aerosol form. It is particularly, though not exclusively, concerned with metered dose medicament aerosols, for example metered dose inhalers.

The upper portion of one known dispenser is shown in vertical section in FIG. 1 of the accompanying drawings. This comprises a metal can body 1 and a metal closure 2 having a flange 3 the lower end of which is crimped around an upper wall portion 4 of the can body 1. The closure 2 has a downwardly opening annular channel 5 within which is received a sealing gasket 6. The upper edge of the wall portion 4 of the can body 1 is in sealing engagement with the gasket 6.

The dispenser is provided with a valve arrangement 7, the purpose of which is to enable metered doses of a material held under pressure within the can body 1 to be dispensed. Most of the details of this are not relevant to the present invention, and, furthermore, they are conventional. For the purposes of the present discussion it is sufficient to note that the valve arrangement 7 includes a metering chamber 8, within which a dose is held prior to being dispensed, and a hollow stem 9 which is longitudinally movable with respect to the chamber 8. The stem has a transfer port 10 and an outlet 11. When the stem is depressed from the position shown, the dose passes from the chamber 8 through the port 10 into the stem, and from there it passes out through the outlet 11. The stem 9 is in slidably sealing engagement with an aperture formed in the centre of a sealing ring 12.

Although the materials used for gaskets in aerosol dispensers are carefully chosen when medical applications are involved, to be as inert as possible, it is nevertheless recognised that it is desirable to reduce the amount of gasket material which can come into contact with the material to be dispensed. The largest gasket area in FIG. 1 is that presented by the gasket 6, and it would therefore be particularly desirable to eliminate gasket 6. Such elimination also potentially offers the prospect of a cheaper dispenser than FIG. 1, by virtue of the fact that it uses one less component.

It is also desirable to ensure that the aerosol dispenser is as nearly leak-proof as possible, and the gasket 6, though found in practice to give a good performance in this respect, does offer a potential leakage path extending circumferentially around the container. For that reason also, it would be desirable to eliminate the gasket and provide a seal between the body 1 and closure 2 which offered no such potential leakage path.

According to the present invention there is provided an aerosol dispenser which comprises a body, a closure sealed to the body, and means for dispensing material from the interior of the dispenser, wherein the closure is welded to the body by a metal-to-metal weld. Preferably the welding is carried out ultrasonically.

The invention also provides a method of assembling an aerosol dispenser comprising a metal body, a metal closure, and means for dispensing material from the interior of the dispenser, wherein the closure is welded to the body by a metal-to-metal seal.

BRIEF DESCRIPTION OF THE DRAWINGS

Further characteristics of the invention will become apparent from the following description and accompanying drawings, wherein:

In FIG. 2, the same numerals are used as in FIG. 1 for the corresponding parts. It will be seen that the metal body 1 terminates at its upper end in an outwardly directed, planar, annular flange 14, and that the circumferentially outer portion of the metal closure 2 is likewise in the form of a planar, annular flange 15. The flanges 14 and 15 are welded together along their mating surfaces 16 by a metal-to-metal weld. It is convenient to weld the flanges ultrasonically using conventional apparatus as for example is described in U.S. Pat. No. 4,749,437. Ultrasonic welding enables only very localised heating to be produced in the region of the weld itself. This may enable the can to be filled before the closure is secured thereto (the alternative being to fill the can through the valve arrangement) since it reduces the risk of the medicament being undesirably heated.

Figure 3:
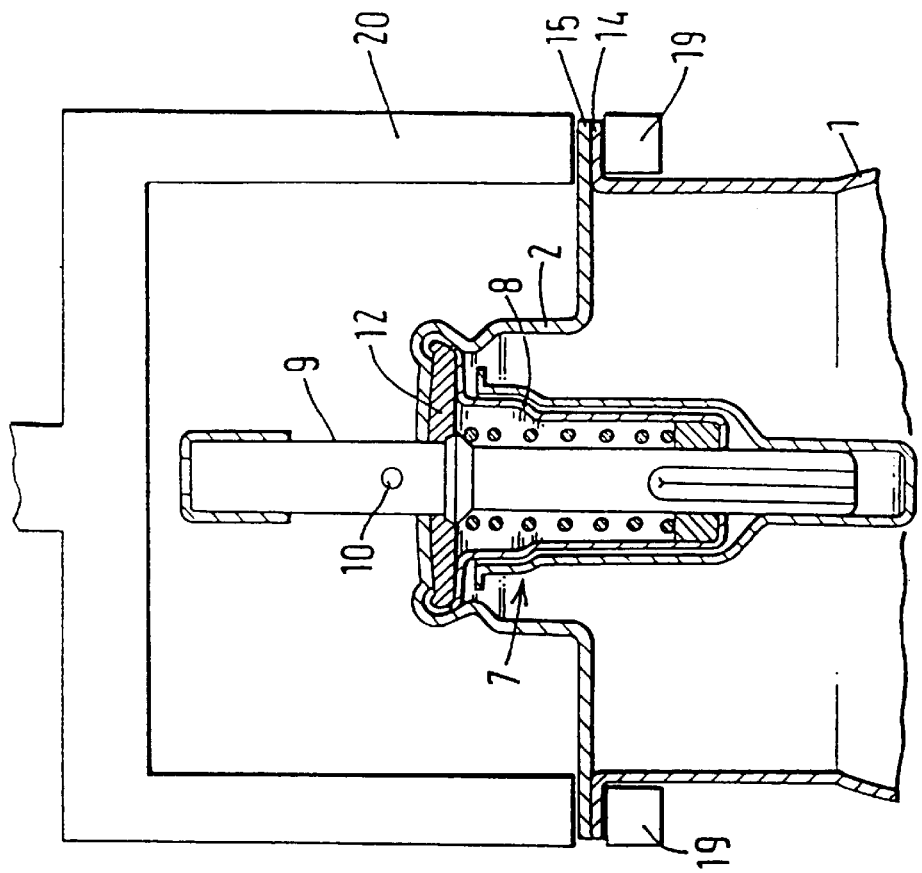
FIG. 3 shows the embodiment of the invention as shown in FIG. 2 together with part of one form of ultrasonic welding head (shown diagrammatically)
Figure 4:
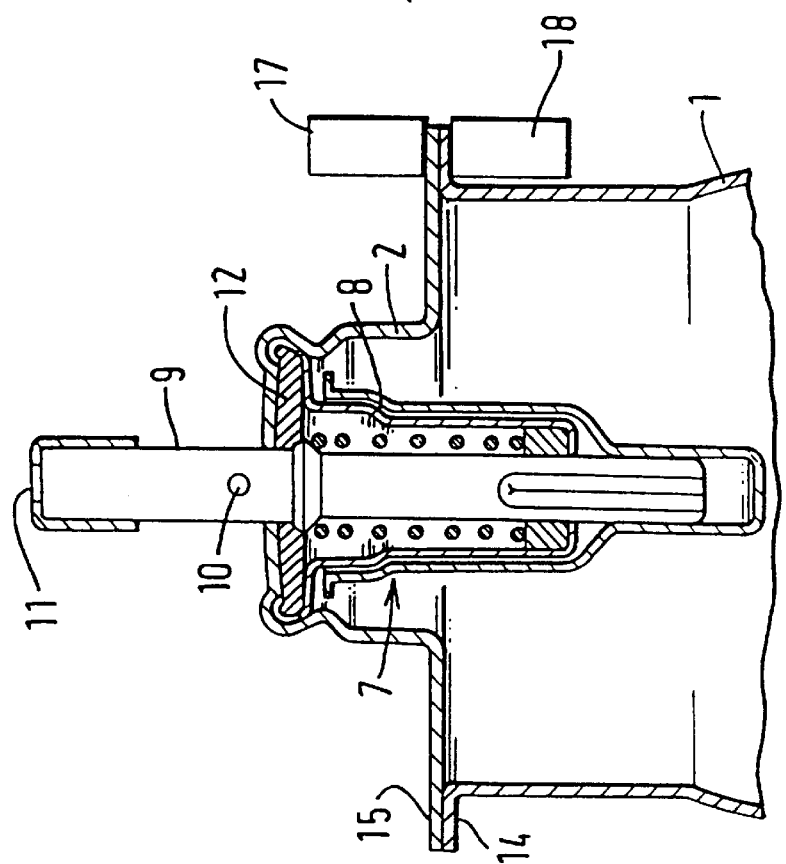
FIG. 4 shows the embodiment of the invention as shown in FIG. 2 together with part of a second form of ultrasonic welding head (shown diagrammatically)

Two alternative procedures will now be mentioned with reference to FIGS. 3 and 4 for forming the weld between the flanges 14 and 15. In the first as depicted in FIG. 3, an ultrasonic welding head travels circumferentially along the flanges until a complete revolution has been performed. This can be done relatively simply though the welding time is then quite long. The welding head can comprise two wheels 17 and 18, one of which engages flange 14 and the other of which engages flange 15. Each wheel is rotatable about an axis extending radially with respect to the annular flange. The wheels are urged towards one another, and at least one of them is vibrated at an ultrasonic frequency along its axis of rotation.

In the second procedure as depicted in FIG. 4, a torsional weld is formed. This involves placing a fixed member or anvil 19 on one side of the pair of flanges (preferably abutting flange 14), and bringing into contact with the other flange (preferably flange 15) a welding horn in the form of a ring 20 which is coaxial with the flange and which vibrates at an ultrasonic frequency about its axis of rotational symmetry.

Figure 5:
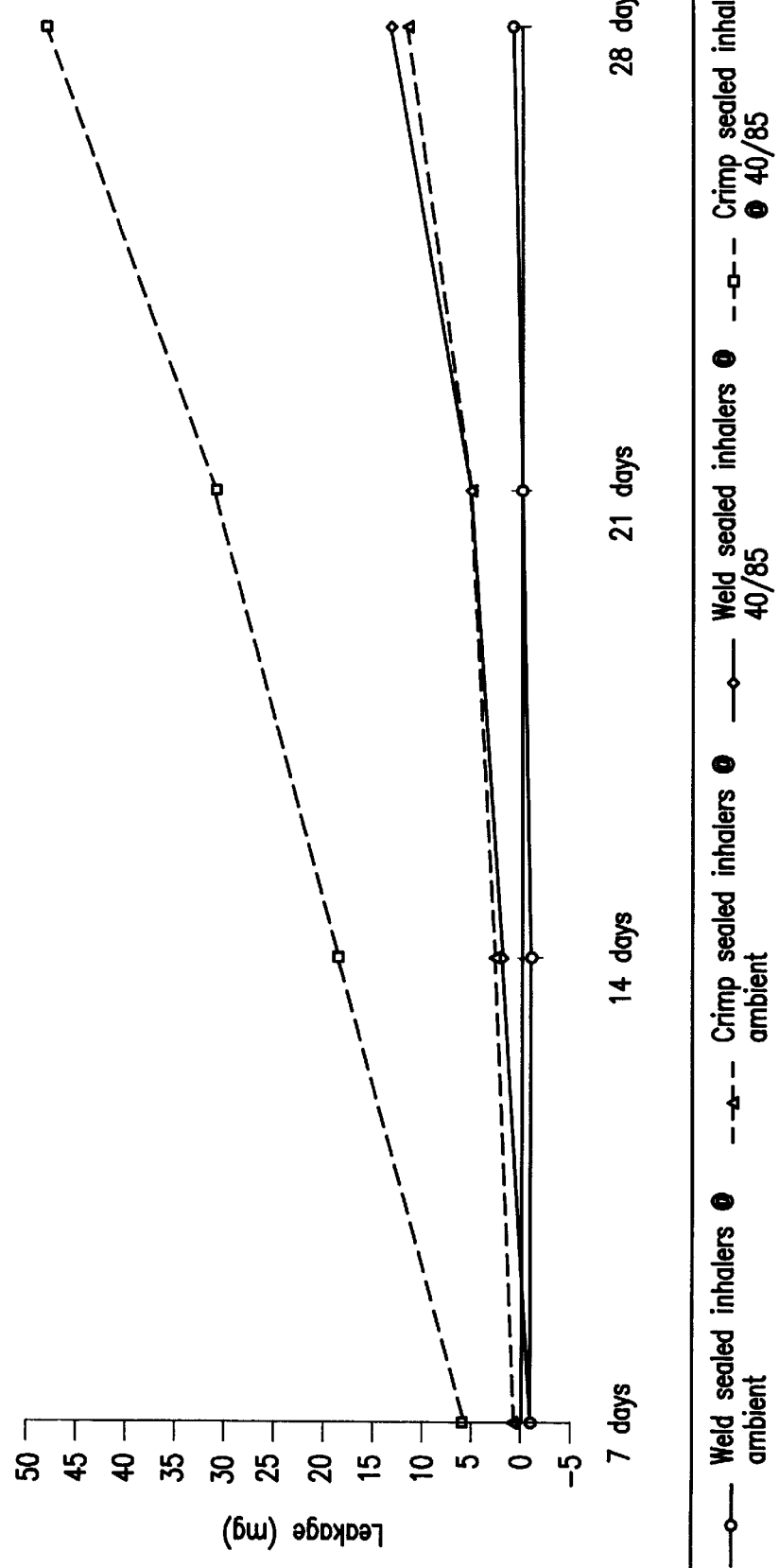
FIG. 5 is a graph showing a comparison of leakage results from cans sealed by metal-to-metal welds with cans sealed conventionally by crimping.
Figure 6:
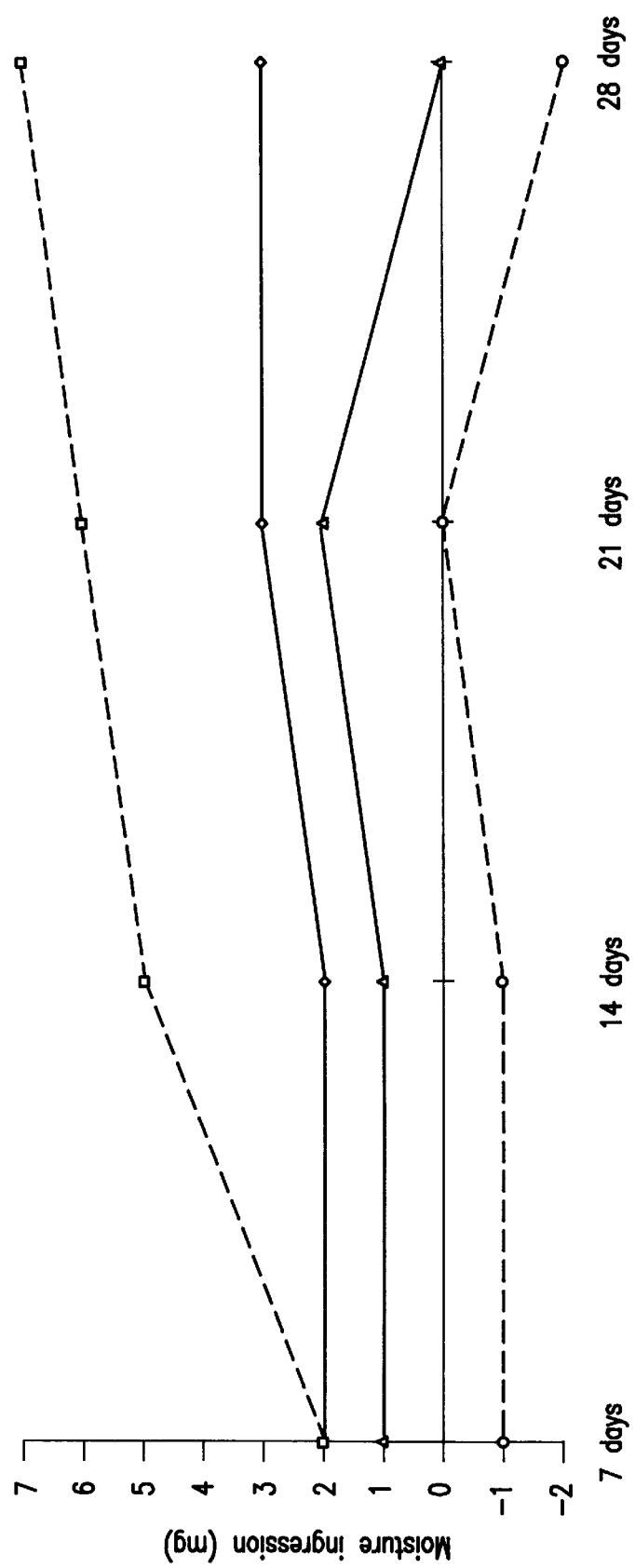
FIG. 6 is a graph showing a comparison of moisture ingression results into cans sealed by metal-to-metal welds with cans sealed conventionally by crimping.

The following tables set out the mean, maximum and minimum results of testing for leakage and moisture ingression in the case of metal closures sealed to metal cans by ultrasonic welding, and metal closures sealed to metal cans by conventional crimping. The results are summarised in the graphs of FIGS. 5 and 6, which plot the average results attained in each test. The leakage tests were carried out using a number of samples of cariclosure, and in each case the cans were filled with a quantity of propellant and the amount of propellant which had leaked from the can was determined at intervals by weighing the sealed can. The moisture ingression tests were also carried out using a number of samples of caniclosure, and in each case a quantity of hygroscopic material (molecular sieve pellets) was sealed in a can and the amount of moisture which had been absorbed by the material was determined at intervals by weighing the sealed can.

The results of the leakage tests show that cans with closures sealed by ultrasonic welding exhibit lower leakage at each weighing interval both under ambient atmospheric conditions and under conditions of high temperature (40° C.) and high relative humidity (85%).

The results of the moisture ingression tests show that under ambient atmospheric conditions the two methods of sealing gave similar effects. However, under conditions of high temperature (40° C.) and high relative humidity (85%), no moisture ingression could be detected with the ultrasonic weld, whereas significant moisture ingression occurred with the crimped seal.

TABLE 1

LEAKAGE TEST RESULTS

Propellant Filled Ultrasonic Weld-Sealed Inhalers

Ambient Storage - sample size: 11 inhalers

| | Weight Loss(g) | | | |
|---|---|---|---|---|
| | 7 days | 14 days | 21 days | 28 days |
| Mean | −0.001 | −0.001 | 0.000 | 0.001 |
| Maximum | 0.001 | 0.000 | 0.001 | 0.002 |
| Minimum | −0.002 | −0.002 | −0.001 | 0.000 |

40° C./85% Relative Humidity Storage - sample size: 10 inhalers

| | Weight Loss (g) | | | |
|---|---|---|---|---|
| | 7 days | 14 days | 21 days | 28 days |
| Mean | −0.001 | 0.002 | 0.005 | 0.013 |
| Maximum | 0.002 | 0.009 | 0.018 | 0.061 |
| Minimum | −0.002 | 0.000 | 0.001 | 0.002 |

Propellant Filled Crimp-Sealed Inhalers

Ambient Storage - sample size: 14 inhalers

| | Weight Loss (g) | | | |
|---|---|---|---|---|
| | 7 days | 14 days | 21 days | 28 days |
| Mean | 0.001 | 0.003 | 0.005 | 0.011 |
| Maximum | 0.002 | 0.006 | 0.008 | 0.015 |
| Minimum | −0.002 | 0.000 | 0.002 | 0.008 |

40° C./85% Relative Humidity Storage - sample size: 15 inhalers

| | Weight Loss (g) | | | |
|---|---|---|---|---|
| | 7 days | 14 days | 21 days | 28 days |
| Mean | 0.006 | 0.019 | 0.031 | 0.048 |
| Maximum | 0.009 | 0.023 | 0.036 | 0.056 |
| Minimum | 0.003 | 0.016 | 0.026 | 0.042 |

TABLE 2

MOISTURE INGRESSION TEST RESULTS

Silica Gel Filled Ultrasonic Weld-Sealed Inhalers

Ambient Storage - sample size: 11 inhalers

| | Weight Gain (g) | | | |
|---|---|---|---|---|
| | 7 days | 14 days | 21 days | 28 days |
| Mean | 0.001 | 0.001 | 0.002 | 0.000 |
| Maximum | 0.002 | 0.002 | 0.003 | 0.002 |
| Minimum | 0.000 | 0.000 | 0.001 | −0.002 |

40° C./85% Relative Humidity Storage - sample size: 15 inhalers

| | Weight Gain (g) | | | |
|---|---|---|---|---|
| | 7 days | 14 days | 21 days | 28 days |
| Mean | 0.002 | 0.002 | 0.003 | 0.003 |
| Maximum | 0.005 | 0.003 | 0.004 | 0.004 |
| Minimum | 0.001 | 0.001 | 0.002 | 0.002 |

Silica Gel Filled Crimp-Sealed Inhalers

Ambient Storage - sample size: 15 inhalers

| | Weight Gain(g) | | | |
|---|---|---|---|---|
| | 7 days | 14 days | 21 days | 28 days |
| Mean | −0.001 | −0.001 | 0.000 | −0.002 |
| Maximum | 0.000 | 0.001 | 0.001 | 0.000 |
| Minimum | −0.002 | −0.002 | −0.002 | −0.003 |

40° C./85% Relative Humidity Storage - sample size: 15 inhalers

| | Weight Gain | | | |
|---|---|---|---|---|
| | 7 days | 14 days | 21 days | 28 days |
| Mean | 0.002 | 0.005 | 0.007 | 0.008 |
| Maximum | 0.004 | 0.006 | 0.009 | 0.009 |
| Minimum | 0.000 | 0.003 | 0.006 | 0.007 |

Figure 1:
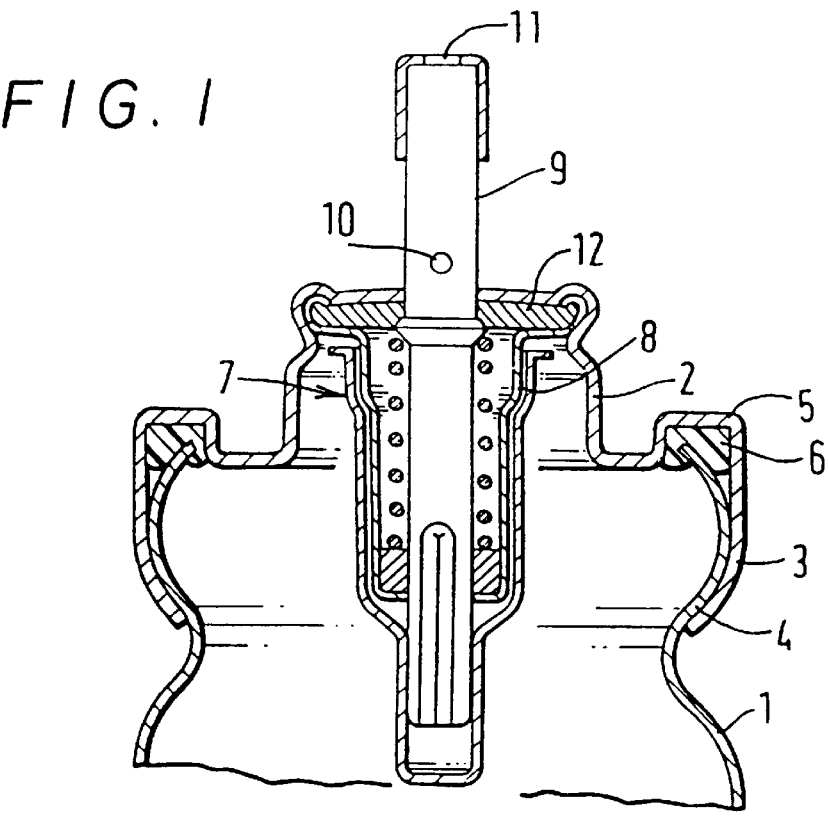
FIG. 1 is a vertical section of a known dispenser.
Figure 2:
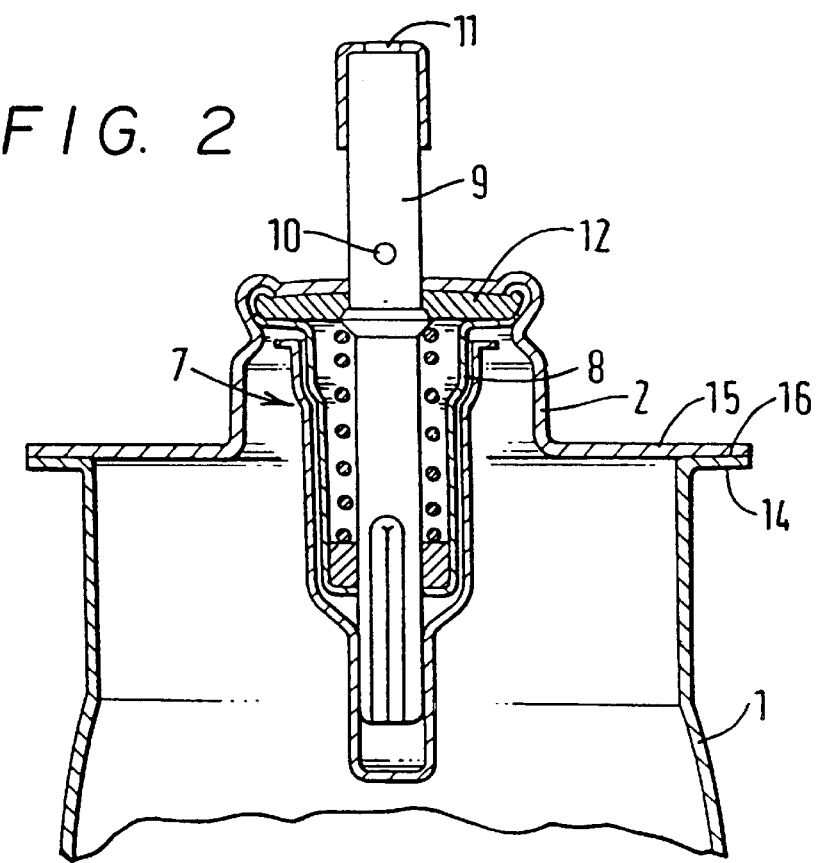
FIG. 2 is a vertical section through an embodiment of the invention.

When the flanges 14 and 15 have the form shown in FIG. 2, the contents of the dispenser, being under pressure, exert a peel force on the weld between the flanges. A welded joint is relatively weak under a peel force, though nevertheless strong enough to withstand any force to which it is reasonably likely to be exposed. If, however, it is desired to avoid exposing the welded joint to a peel force, the flanges can alternatively have the shape in FIG. 7 wherein the flanges are axially directed and cylindrical. To achieve this, either the flanges may be welded in the form shown in FIG. 2, and then bent through 90°, or they may be bent first and welded afterwards.

Figure 7:
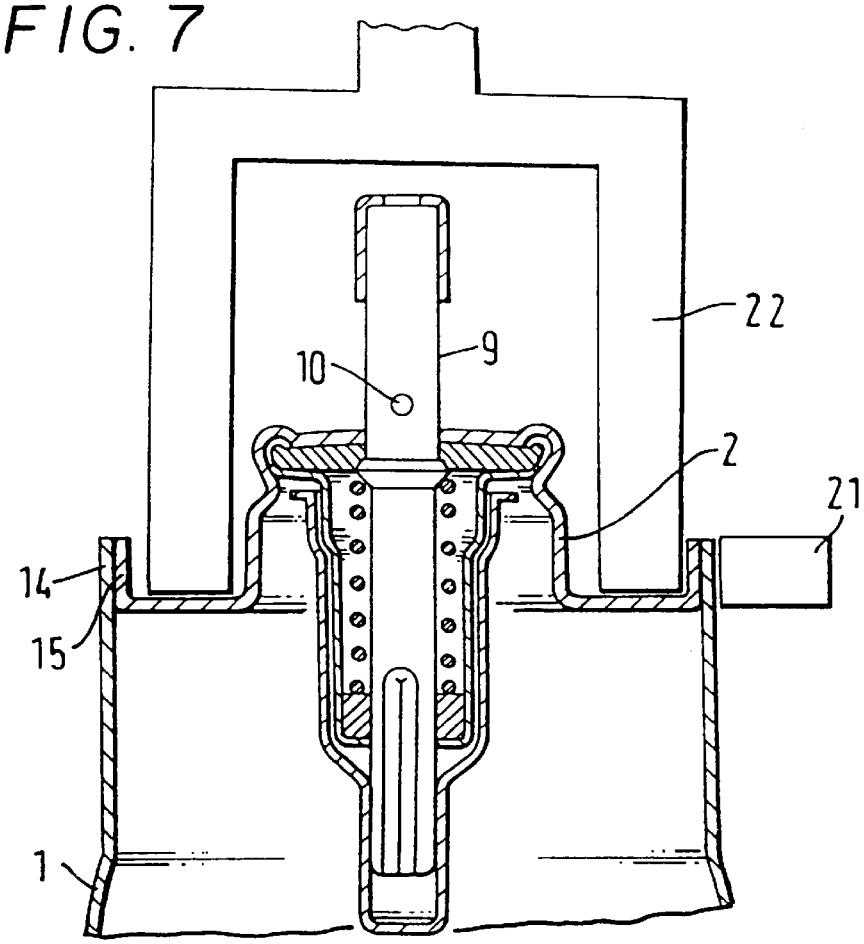
FIG. 7 is a vertical section through a second embodiment of the invention, together with part of an ultrasonic welding head (shown diagrammatically)

In the latter case, the weld may be formned by an ultrasonic welding device shown in FIG. 7 in which a first wheel 21 travels around the outside of the flange 14, and a second wheel 22, mounted eccentrically with respect to the longitudinal axis of the dispenser, contacts the inside of the flange 11 at a point which moves around the flange 15 in unison with the movement of the first wheel until a complete revolution of the flange has been performed. During this process, the wheel 21 vibrates ultrasonically along its axis of rotation (i.e. up and down as drawn), the wheels 21 and 22 simultaneously being urged towards one another with a substantial force. Means (not shown) are provided to ensure that the closure does not fall into the can body during the sealing process. The second wheel 22 has the shape of an inverted cup, in order to avoid being fouled by the valve stem 9 and the adjacent portion of the closure 2.

Figure 8:
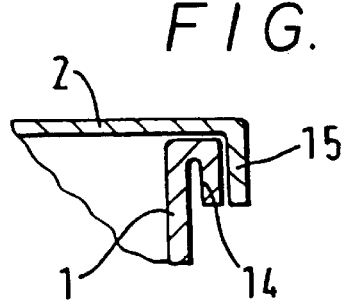
FIG. 8 shows a detail of a modification of the embodiment of FIG. 7.
Figure 9:
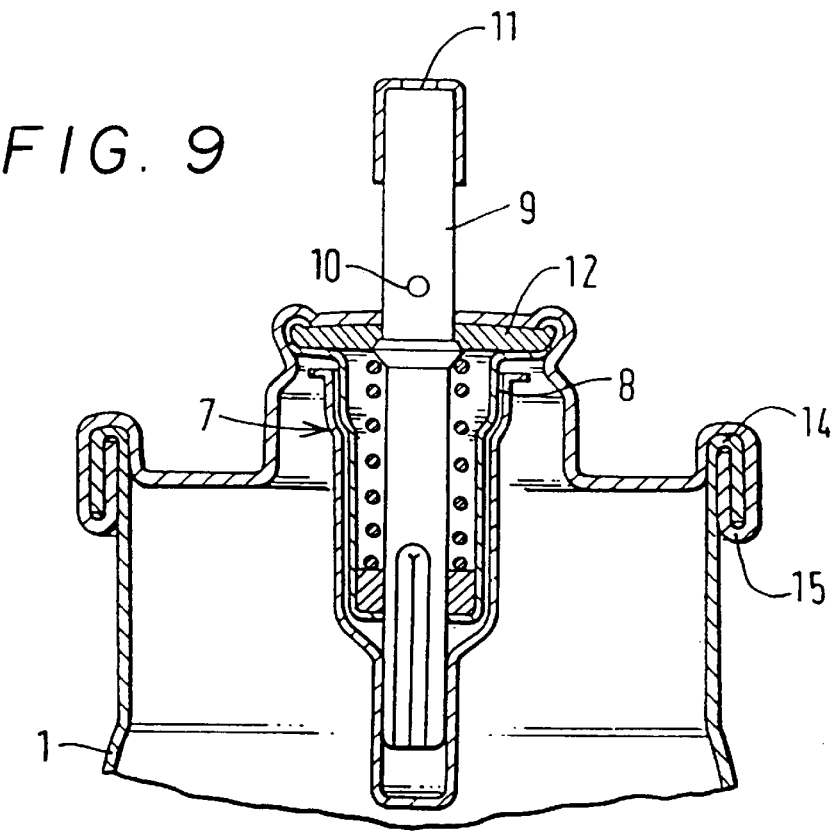
FIG. 9 shows a further embodiment.

An alternative to the flange shape of FIG. 7 as a way of avoiding subjecting the weld joint to a peel force is shown in FIG. 8, in which the flanges are welded in the shape shown in FIG. 2, and then bent downwardly.

Figure 10B:
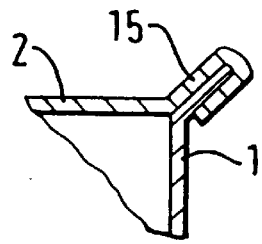
FIGS. 10a to 10c show successive steps in assembling the embodiment of FIG. 9.
Figure 10C:
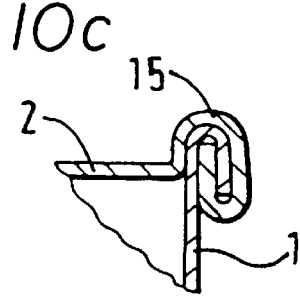
Figure 10A:
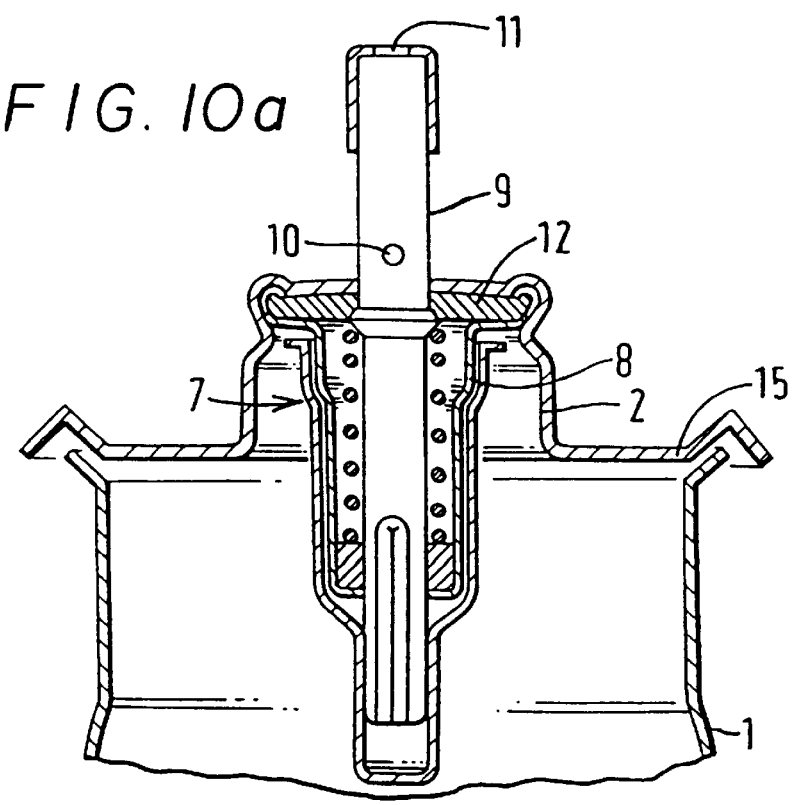

Correctly carried out, ultrasonic welding should give a completely leak-proof seal between the flanges. However, it is possible as a precaution to further seal the flanges together by having interengaging U-shaped portions on the body and closure. This is shown in FIG. 9, and FIGS. 10a to 10c show successive steps in sealing the closure to the body to form the construction shown in FIG. 9. The ultrasonic weld is formed after the closure 2 and can body 1 have been formed as shown in FIG. 10a and assembled with one another, but before the rolling and crimping operations of FIGS. 10b and 10c have been carried out.

I claim:

1. A method of assembling an aerosol dispenser comprising a metal body, a metal closure, and means for dispensing material from the interior of the dispenser, wherein the closure comprises an annular flange extending circumferentially about its axis, is positioned at the open end of and coaxially with the body which comprises a complementary annular flange extending circumferentially about its axis, such that the flanges are parallel and in contact with each other wherein the flanges are outwardly directed and flat and wherein a fixed member is placed on one side of the pair of flanges and a welding horn in the form of a ring is brought into contact with the other flange to urge the flanges together, said ring being coaxial with and of substantially the same diameter as said flanges, and whereby the ring is vibrated at an ultrasonic frequency about its axis of rotational symmetry to weld the flanges together ultrasonically to form a metal-to-metal seal.

2. An aerosol dispenser according to claim 1, which is an inhaler and contains an aerosol medicament.

3. A method of assembling an aerosol dispenser according to claim 1, wherein the flanges are welded together by means of an ultrasonic welding head which is brought into communication with the flanges and moved circumferentially along the flanges to create a substantially continuous weld between the flanges until a complete revolution about the axis of the closure and body has been performed.

4. A method of assembling an aerosol dispenser according to claim 1 wherein the flanges are bent to lie in a substantially axial direction after the flanges have been welded together.

5. A method of assembling an aerosol dispenser according to claim 1 wherein one of the said flanges is of greater width than the other and after the flanges have been welded together the wider flange is rolled and crimped around the other flange.

6. A method of assembling an aerosol dispenser according to claim 1 wherein the flanges are rolled and crimped after they have been welded together.

7. A method of assembling an aerosol dispenser according to claim 3 wherein the flanges are outwardly directed and flat.

8. A method of assembling an aerosol dispenser according to claim 7, whereby the ultrasonic welding head causes relative vibration between the flanges in a direction which is radial with respect to the said axis.

9. A method of assembling an aerosol dispenser according to claim 3 wherein the said flanges are axially directed and cylindrical.

10. A method of assembling an aerosol dispenser according to claim 9 wherein the ultrasonic welding head causes relative vibration between the flanges in an axial direction.

\* \* \* \* \*